United States Patent
Chennakeshu et al.

(10) Patent No.: US 6,542,758 B1
(45) Date of Patent: Apr. 1, 2003

(54) DISTRIBUTED RADIO TELEPHONE FOR USE IN A VEHICLE

(75) Inventors: Sandeeep Chennakeshu, Cary, NC (US); David Townsend, Chapel Hill, NC (US); David R. Irvin, Raleigh, NC (US); Nils Rydbeck, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/359,551

(22) Filed: Jul. 22, 1999

Related U.S. Application Data

(63) Continuation-in-part of application No. 08/989,115, filed on Dec. 11, 1997, now abandoned.

(51) Int. Cl.[7] .................................................. H04B 1/38
(52) U.S. Cl. .......................... 455/569; 455/575; 455/557
(58) Field of Search .................................. 455/557, 556, 455/90, 575, 568, 566, 564, 565, 571, 569, 426

(56) References Cited

U.S. PATENT DOCUMENTS

| | | | |
|---|---|---|---|
| 4,847,887 A | * | 7/1989 | Suzuki et al. ................. 45/90 |
| 4,868,888 A | * | 9/1989 | Dayton ........................ 455/90 |
| 5,319,803 A | * | 6/1994 | Allen ......................... 455/89 |
| 5,418,836 A | * | 5/1995 | Yazaki ........................ 455/90 |
| 5,659,594 A | | 8/1997 | Toda |
| 5,715,522 A | | 2/1998 | Vimpari et al. |
| 5,896,375 A | | 4/1999 | Dent et al. |
| 5,913,163 A | * | 6/1999 | Johnsson ..................... 455/426 |
| 5,918,180 A | * | 6/1999 | Dimino ....................... 455/456 |
| 5,974,332 A | * | 10/1999 | Chung ........................ 455/569 |
| 6,081,724 A | * | 6/2000 | Wilson ........................ 455/569 |
| 6,131,042 A | * | 10/2000 | Lee et al. .................... 455/556 |
| 6,216,018 B1 | * | 4/2001 | Nakanishi et al. .......... 455/569 |
| 6,226,529 B1 | * | 5/2001 | Bruno et al. ................. 455/557 |
| 6,230,029 B1 | * | 5/2001 | Hahn et al. .................. 455/568 |
| 6,272,359 B1 | * | 8/2001 | Kivela et al. ............... 455/567 |

FOREIGN PATENT DOCUMENTS

| | | |
|---|---|---|
| EP | 0920170 A2 | 6/1998 |
| GB | 2264613 A | 9/1993 |
| WO | WO 96/32783 | 10/1996 |
| WO | WO 98/53584 | 11/1998 |
| WO | WO 99/30429 | 6/1999 |

* cited by examiner

*Primary Examiner*—Edward F. Urban
*Assistant Examiner*—Tilahun Gesesse
(74) *Attorney, Agent, or Firm*—Coats & Bennett, P.L.L.C.

(57) ABSTRACT

A vehicle mounted communication system comprises a hand held mobile phone and a hands-free unit. The hand-held unit includes a wide area transceiver for station outside of the vehicle and a short-range radio transceiver the hands-free unit includes a microphone and speaker and is mounted in a fixed location in the vehicle. A short range radio link operatively connects the hand-held unit and the hands-free unit to enable voice and data signals to be exchanged between the hand-held unit and the hands-free unit. The hands-free unit may include a programmable memory unit to store a user table containing user identification data and configuration data. The hands-free unit control logic configures the hands-free unit based on the user identification received from the hand-held unit, thus allowing multiple users to have their preferences recognized by an individual hands-free unit. The programmable memory unit and control logic may be incorporated into the vehicle's internal network for control of things like electric seats, stereo controls and the like.

17 Claims, 16 Drawing Sheets

DISTRIBUTED RADIO TELEPHONE FOR USE IN A VEHICLE

This application is a continuation-in-part of previously filed application Ser. No. 08/989,115 filed Dec. 11, 1997, now abandoned.

FIELD OF THE INVENTION

The present invention relates generally to mobile radio telephones and, more particularly, to a distributed mobile radio telephone for use in a vehicle.

BACKGROUND OF THE INVENTION

At present, there are three generally accepted ways to provide cellular telephone service to the driver of a vehicle. First, a standard, handheld cellular telephone may be used by the driver. The power for the handheld cellular telephone can be provided by the handheld unit's own battery pack or by an adapter which plugs into the vehicle's cigarette lighter. Second, a standard handheld cellular telephone can be held by a cradle mounted within the interior of the vehicle. The cradle may include an external speaker and microphone to permit hands-free operation once a call is established. Third, the vehicle may be provided with a built-in cellular telephone which is permanently fixed to the vehicle.

Each of the aforementioned solutions makes undesired tradeoffs among various design goals that include ergonomics, aesthetics, functional versatility, phone performance, expandability, and ease of installation and maintenance. For example, the first solution—using a standard handheld terminal—provides versatility and ease of installation and maintenance at the expense of ergonomics, aesthetics, and phone performance. In brief, using a handheld cellular telephone requires awkward exertion on the part of the driver to position the phone next to a window. Even if the phone can be, positioned near a window, the vehicle's body often obscures the RF path between the phone's antenna and the cellular base station thereby limiting the phone's performance. Also, the only functions available to the driver are those provided by the handheld phone.

The second solution—mounting a handheld cellular telephone in a cradle—is an improvement over the first solution. Nevertheless, this solution also has drawbacks, primarily concerning ergonomics, aesthetics, and phone performance. Since the cradle is normally mounted outside the driver's normal line of sight, the driver must shift his or her field of vision in order to use the cellular telephone. Further, cradles are normally sold as after-market devices whose appearance is not necessarily harmonious with the vehicle's interior decoration. Cradles often suffer from dangling power cables, microphones, and control buttons. As in the first solution, the driver is limited to the functions provided by the handheld phone. Also, unless an external booster is used—which brings its own problems regarding expense, installation, and aesthetics—the phone's performance is limited by its power amplifier, which is designed to meet the battery constraints of a handheld terminal.

The third solution—a built in cellular phone—provides improved aesthetics since it is normally designed to be harmonious with the vehicle's interior. The trade off is in ergonomics, versatility, ease of maintenance, and ease of modification. Even in built in phones, the phone's controls are normally placed outside the driver's field of vision. Thus, the driver is required to shift his or her field of vision in order to operate the phone. Moreover, the freedom of having a detachable handheld telephone is lost. The phone cannot be removed from the vehicle when the driver departs from the vehicle. Furthermore, new features and functions cannot be readily added to a built in phone, nor can a built in phone be readily returned to its manufacturer for maintenance or upgrade.

SUMMARY OF THE INVENTION

The present invention relates to a radiotelephone for use in a vehicle. The radiotelephone includes a base unit mounted within the vehicle having a wide area transceiver for communicating with a station outside the vehicle, a control unit disposed in the vehicle remotely from the base unit, and a local area network for establishing a communication link between the base unit and the control unit. The local area network is adapted to transmit control and data signals between the base unit and the control unit. The control unit includes a keypad for entering commands and data which are transmitted to the base unit via the local area network, and a display for displaying information to the user. The control unit may also include a speaker and microphone. Alternatively, the speaker and microphone may be contained in a remote audio unit which is linked to the base unit via the local area network. In a preferred embodiment of the invention, a first local area transceiver is located with the control unit, and a second local area transceiver is located with the base unit to provide wireless communication between the base unit and the control unit. If a remote audio unit is used, a third local area transceiver would be located in the remote audio unit.

The control unit is typically mounted on the steering wheel of the vehicle. The control unit may be fully integrated into the steering column of the vehicle or, alternatively, may be a self-contained unit which attaches to the steering wheel of the vehicle. Power for the control unit may be provided by the vehicle's battery, by a solar panel disposed within the vehicle, or by its own batteries.

In one embodiment of the invention, the base unit is a closed box which is concealed within the vehicle. For example, the base unit may be mounted in a console or in a trunk of the vehicle. User interaction with the base unit is strictly through the control unit. In this embodiment, certain components of the base unit, such as the wide area transceiver, may be embodied in cards which plug into the base unit. This allows for easy upgrading and repair of the base unit.

The base unit could comprise a standard hand-held radiotelephone. In this embodiment, the local area transceiver could be incorporated into the radiotelephone, or may reside in removable battery pack which attaches to the radiotelephone. A third option is to place the transceiver in a separate adapter which connects to the radiotelephone. With regard to the third option, the adapter may consist of a cradle for receiving and holding the hand-held radiotelephone. One advantage of locating the transceiver within either a.removable battery pack or an adapter is that the transceiver becomes an accessory which can be offered as an option to the user.

In another embodiment of the invention, the distributed components of the radiotelephone may communicate over a LAN which is inherent to the vehicle. Oftentimes, the vehicle's manufacturer will include a local area network in a vehicle which ties together various systems of the vehicle. The control unit, base unit, and audio units of the present invention may use the excess capacity of the vehicle's own LAN to communicate with one another. Because the radiotelephone shares the LAN with various components of the vehicle, the radiotelephone may be used to augment or work with the inherent systems on the vehicle. For example, the vehicle's security system could be programmed to place a telephone call notifying local law enforcement authorities if the vehicle is stolen. This notification may include the position of the vehicle if the vehicle also has an on-board GPS receiver.

These and other aspects of the present invention will become apparent to those skilled in the art after a reading of the following description of the preferred embodiments when considered with the drawings.

DETAILED DESCRIPTION OF THE INVENTION

Figure 1:
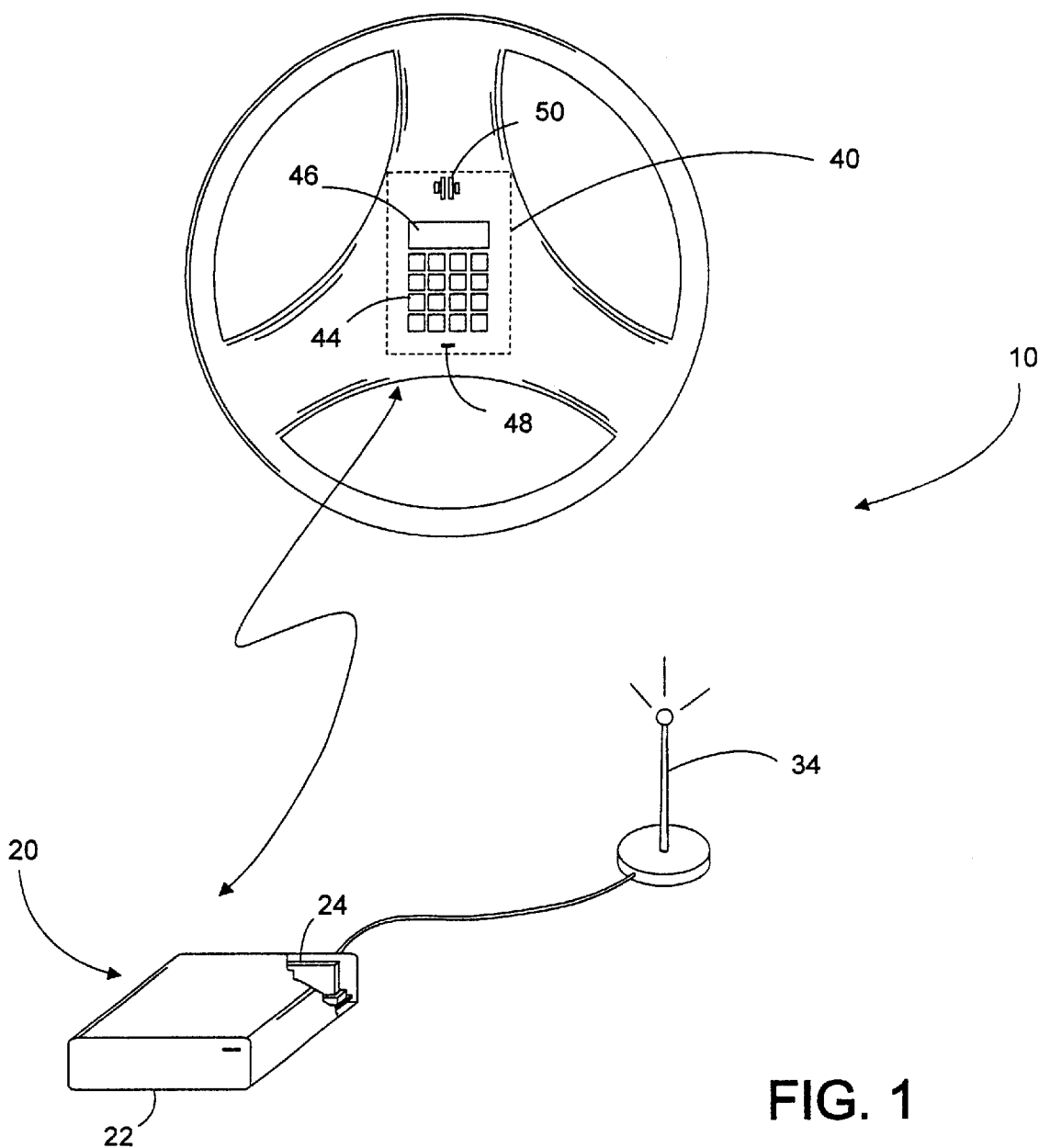
FIG. 1 is a schematic drawing showing the distributed radiotelephone of the present invention.

Referring now to the drawings, the mobile phone system of the present invention is shown therein and indicated generally by the numeral 10. The mobile phone system 10 is particularly adapted for use in a vehicle. The mobile phone system 10 is distributed over a number of separate and distinct physical units which are positioned at different locations within the vehicle. The separate physical units communicate with one another through a local wireless communications link. The preferred embodiment of the invention includes two physical units: a base unit 20 and a control unit 40. The base unit 20 includes a fully functional transceiver capable of sending and receiving radio signals to and from a station located outside of the vehicle. The control unit 40 includes the interface elements needed by the user to control the transceiver. In the preferred embodiment of the invention, the base unit 20 is located in the trunk or console of the vehicle, or under the seat of a vehicle. The control unit 40 is preferably integrated into the vehicle's steering wheel or, alternatively, may be attached to the steering wheel.

Figure 2:
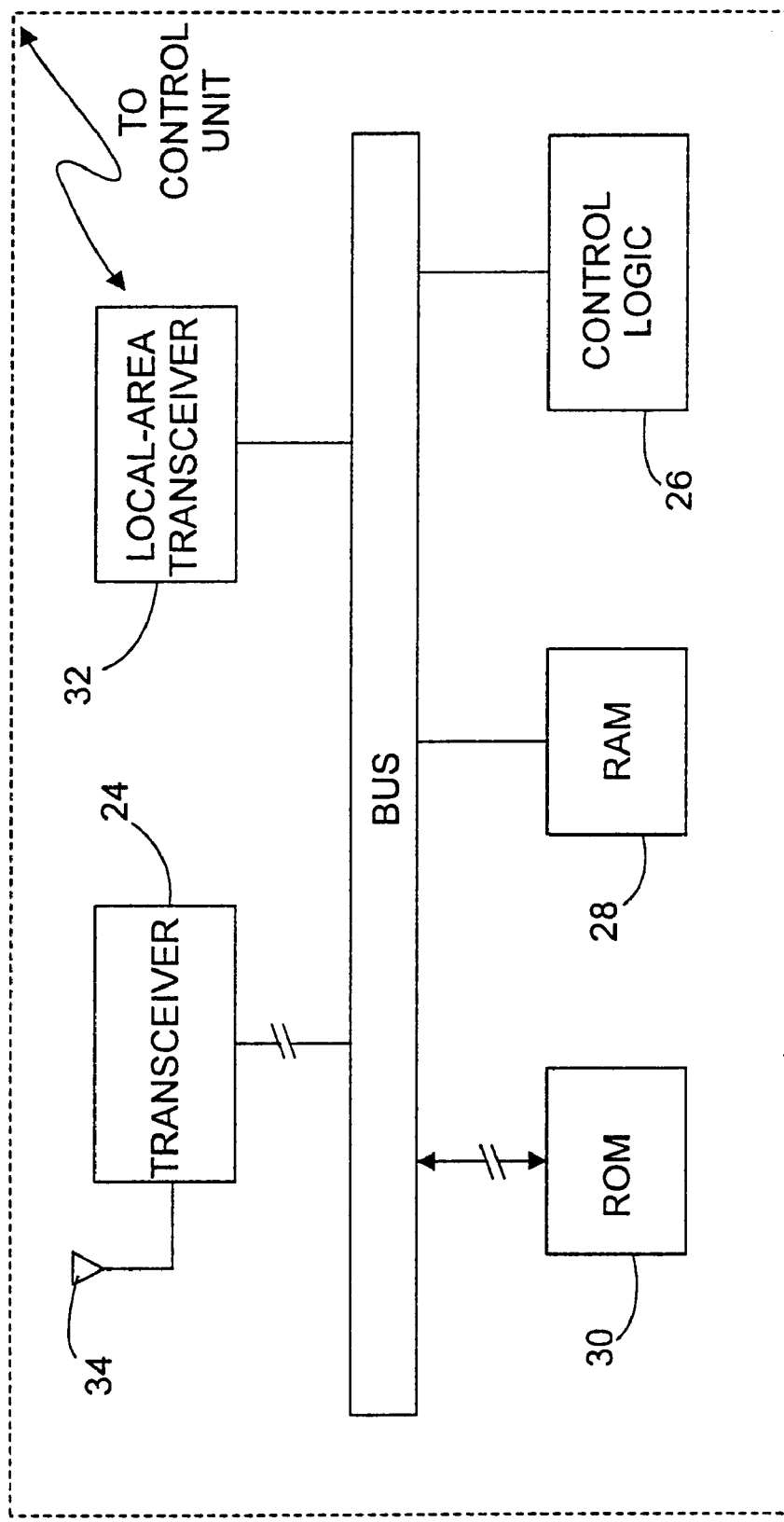
FIG. 2 is a block diagram illustrating the control unit of the radiotelephone.

Referring now to FIG. 2, a block diagram of the base unit is shown. The base unit 20 includes an RF transceiver 24, control logic 26, volatile memory (RAM) 28, non-volatile memory (ROM) 30, and an interface module 32. The RF transceiver 24 may be, for example, a class 1 mobile phone transceiver capable of transmitting and receiving radio signals to and from stations outside of the vehicle. The control logic 26 controls the operation of the transceiver 24 and modem 32 according to instructions stored in the non-volatile memory 30. The volatile memory 28 provides memory for temporarily storing data which is needed by the control logic 26 during operation of the mobile phone system 10. The interface module 32 provides a communications link between the base unit 20 and the control unit 40.

In a preferred embodiment of the invention, the base unit 20 includes a housing 22 which contains the electronic components of the base unit 20. The control logic 26 is contained in a main circuit board. The RF transceiver 24 and non-volatile memory 30 are contained in separate cards which plug into sockets on the main circuit board. The RF transceiver 24 and non-volatile memory 30 may be contained in a single card or may be on separate cards. By placing the RF transceiver 24 and non-volatile memory 30 on removable cards, these components may be readily replaced or upgraded. For example, a transceiver 24 that operates according to one cellular standard may be replaced by a transceiver 24 operating according to a different cellular standard. Similarly, upgrades or enhancements to the functionality of the phone system 10 can be made by replacing a memory card.

Figure 3:
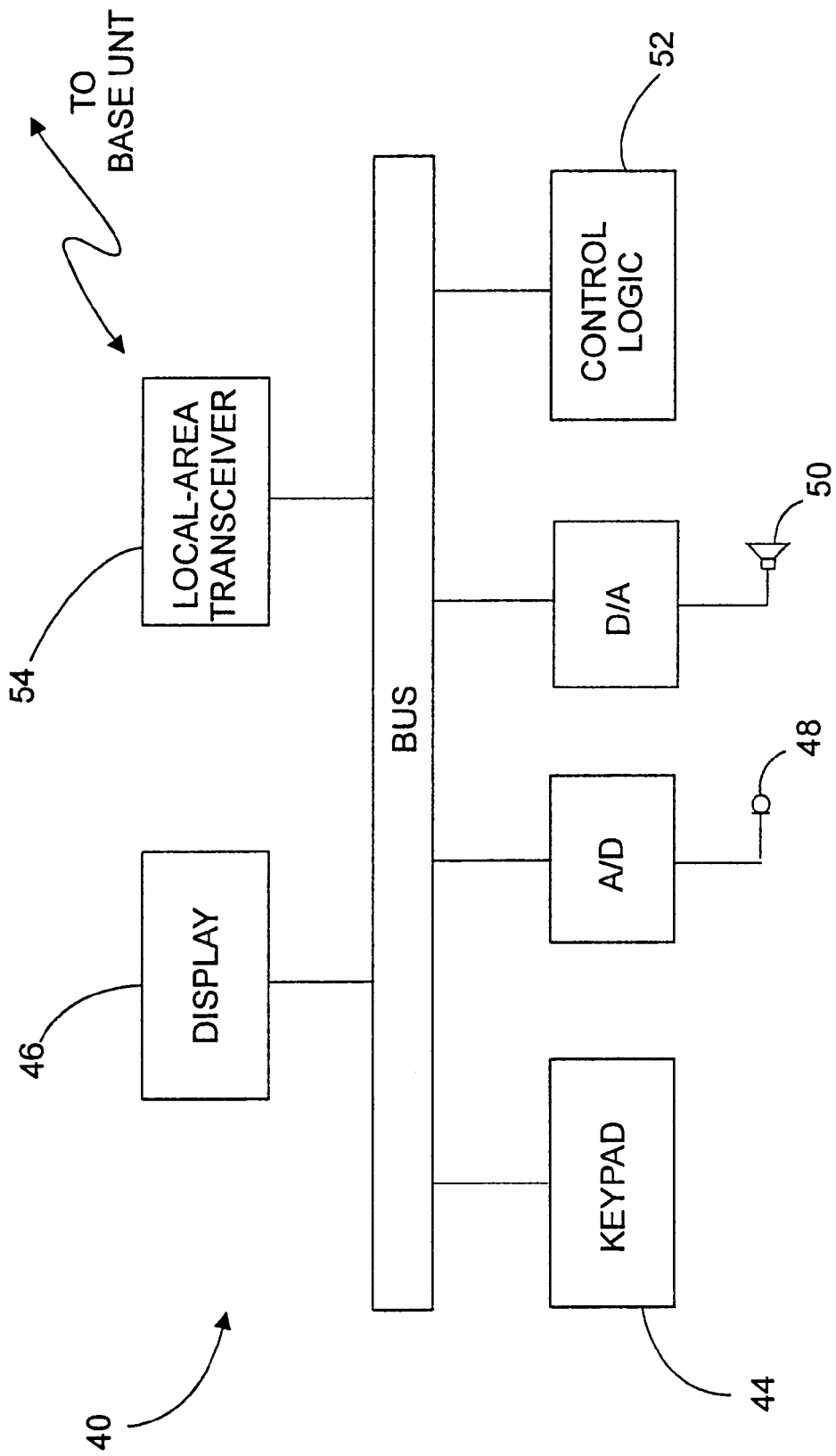
FIG. 3 is a block diagram illustrating the base unit of the radiotelephone.

FIG. 3 is a block diagram of the control unit 40. The control unit 40, as previously mentioned, is preferably integrated into the vehicle's steering wheel. The control unit 40 includes a keypad 44, display 46, microphone 48, and speaker 50 which serves as the interface elements between the user and the base unit 20. The keypad 44 is used to enter data and commands by the user. For example, a common use for the keypad 44 would be to enter a telephone number and "send" command to establish an outgoing call. The display 46 is used to display information, such as the number dialed and call status information, to the user. Microphone 48 converts the user's voice into audio signals which are to be transmitted by the base unit 20 to a remote station located outside the vehicle. The speaker 50 converts audio signals received by the base unit 20 into audible sounds which can be heard by the user. Control logic 52 controls the operation of the control unit 40 according to instructions stored in its internal memory. An interface module 54 contained within the control unit 40 provides a communications link between the control unit 40 and the base unit 20.

In the preferred embodiment of the invention, the interface modules 32 and 54 that provide the communications link between the base unit 20 and control unit 40 are short range RF transceivers which transmit and receive signals over a limited distance. An example of one such interface is the Bluetooth interface. The Bluetooth interface operates in the license free RF band authorized internationally at 2.4 GHz. Slow frequency hopping is used to combat interference and fading. A binary, frequency modulation scheme is used for transmissions. The physical layer of the link provides a gross data rate of 1 mbs with a frame period of 1.25 ms. The Bluetooth interface is described in an article published in *Ericsson Review*, No. 3, 1988, entitled "Bluetooth—The Universal Radio Interface For Ad Hoc Wireless Connectivity," which is incorporated herein by reference.

Figure 4:
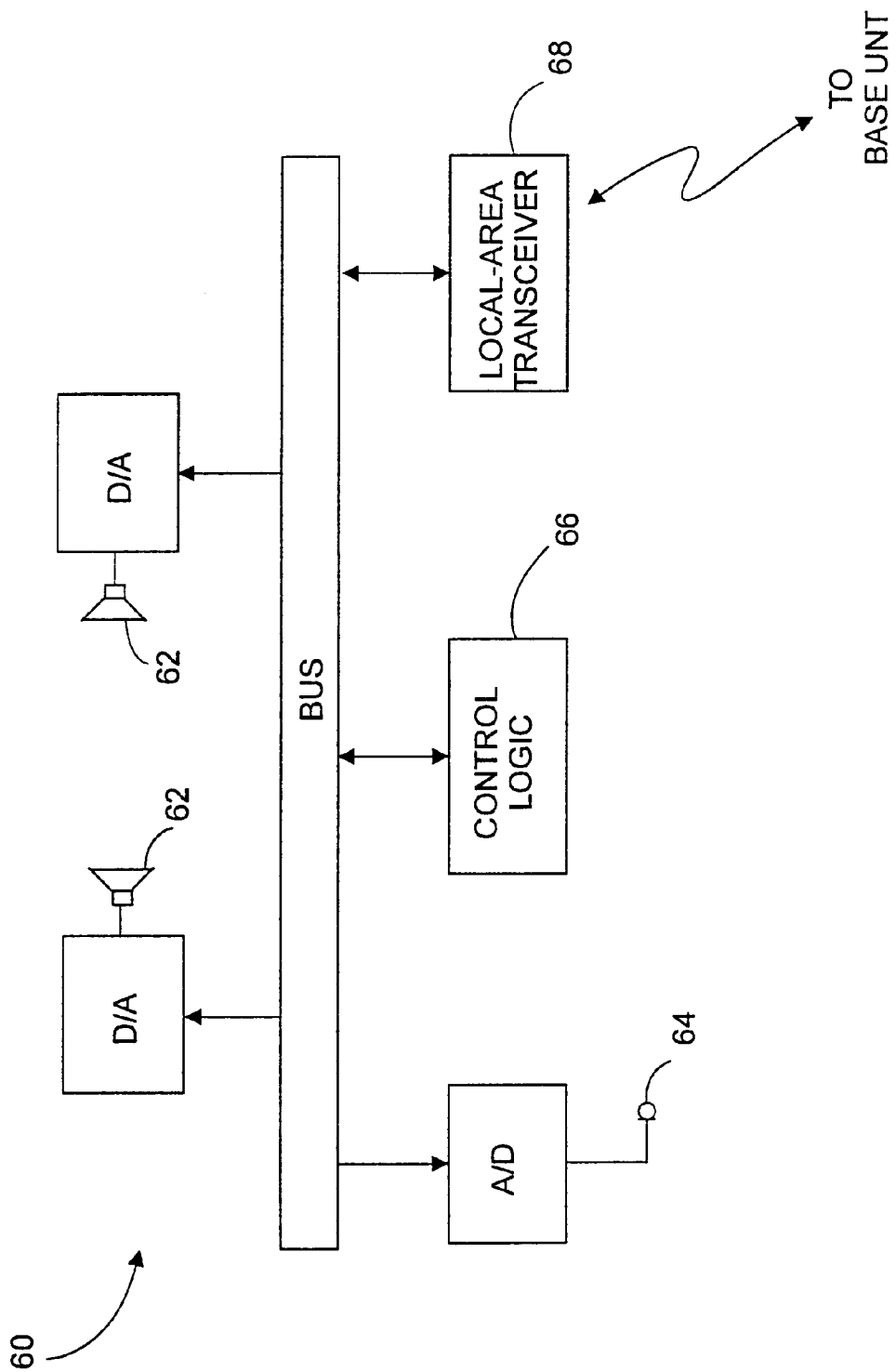
FIG. 4 is a block diagram illustrating an optional audio unit for the radiotelephone.

A packet switching, link control protocol is used wherein each packet is transmitted in a different frequency hop. Two full duplex logical channels are derived from the flow of packets—a synchronous voice channel that is used to carry 64 kbs sampled audio signals with robust source and channel encoding, and an asynchronous data channel with ARQ error recovery and a capacity of 170 to 200 kbs. Referring now to FIG. 4, a block diagram of a remote audio unit 60 is shown. The remote audio unit 60 is an accessory whose primary purpose is to enhance audio performance by providing multiple microphones for noise cancellation and external speakers for superior voice output fidelity. As shown in FIG. 4, the remote audio unit 60 includes a pair of speakers 62, each with its own power amplifier, and a microphone 64. Alternatively, the speakers 62 and microphone 64 may be placed in separate audio units 60 so that they may be positioned within the vehicle independently of one another. The remote audio unit 60 includes an interface module 68 for communicating with the base unit 20. Control logic 66 controls the operation of the remote audio unit 60.

In use, the driver of a vehicle may initiate a telephone call by entering a telephone number using the keypad 44 and pressing a "send" key. The "send" instruction is transmitted via modems 32 and 54 from the control unit 40 to the base unit 20 along with the number to be dialed. The base unit 20 then initiates the call according to normal cellular telephony practices. Once the call is established, audio signals received by the base unit 20 are transmitted to either the control unit 40 or to a remote audio unit 60 and are converted to audible sounds by the speaker 50 or 64. The microphone 48 in the control unit 40 converts the driver's voice into audio signals which are transmitted to the base unit 20 for further transmission to a remote station outside of the vehicle.

The division of the phone into separate physical units that communicate through a wireless, local area network, as shown in FIGS. 1 through 3, solves a long standing problem in vehicular telephony: how to integrate the cellular phone into the vehicle's steering wheel. In the past, attempts have been made to locate a keypad in the steering wheel. Nevertheless, meaningful integration of the phone's function into the steering wheel have failed, mainly because galvanic clock springs have been the only robust way of providing connection to electronic devices that are integrated into the steering wheel. However, clock springs cannot efficiently provide the large bundle of connections needed to support the wide spectrum of cellular phone functions which are demanded by consumers. Furthermore, clock springs have high self-inductance and are therefore unsuitable for transmitting VHF and UHF signals that arise from radio communication. In particular, VHF and UHF signals cannot be passed through a clock spring to or from an antenna. Thus, in the past, the special needs of a cellular telephone's RF path have blocked the integration of a phone into a steering wheel hub.

The present invention overcomes the limitations of the prior art by eliminating the need to pass either RF signals or wires through the clock springs in the steering wheel. Instead, control information and audio signals are transmitted from the control unit 40 in the steering wheel to the base unit 20 by RF without passing through the clock springs of the steering wheel. The clock spring is used only to provide operating power to the control unit 40 in the steering wheel.

Figure 5:
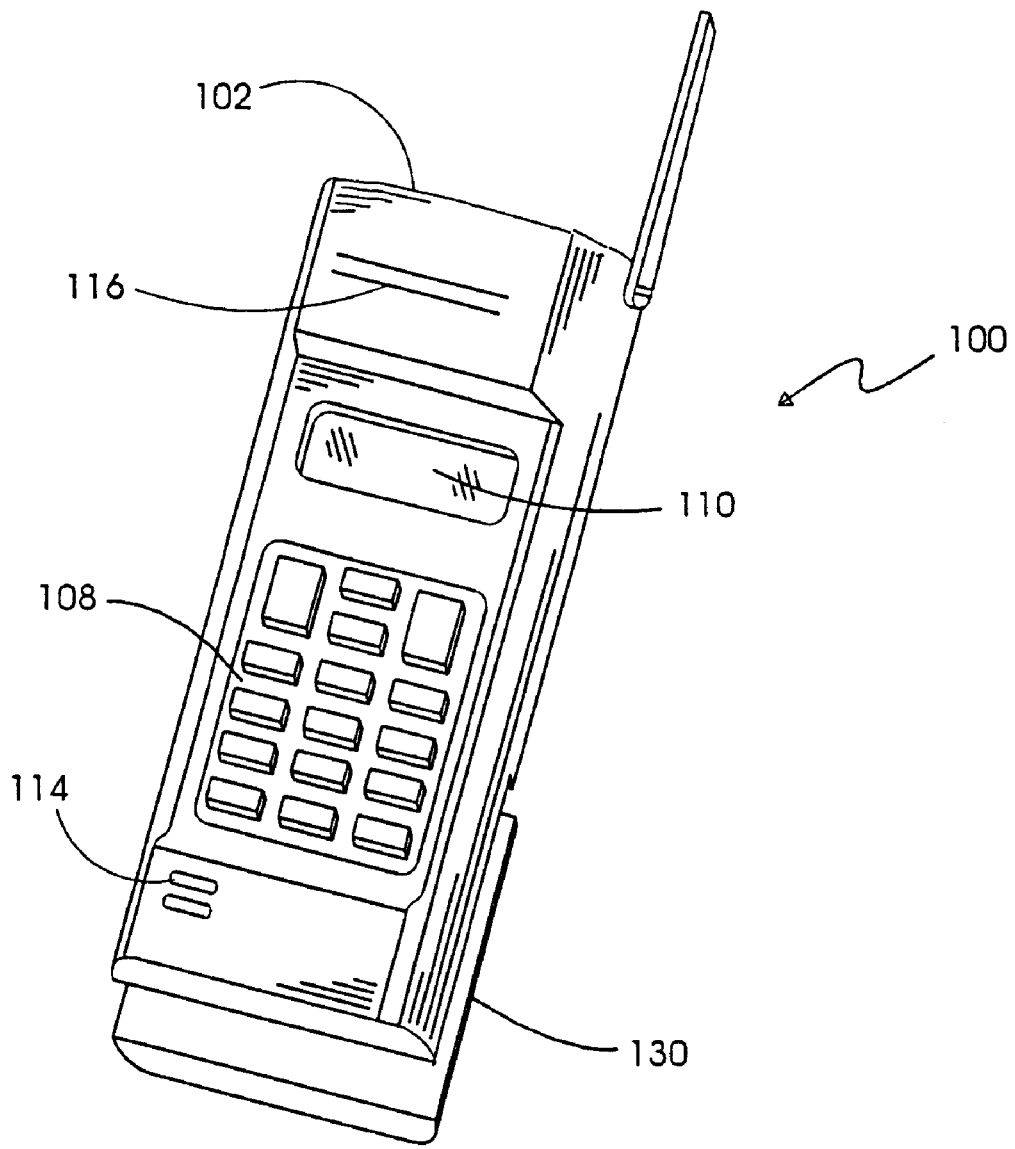
FIG. 5 is a perspective view of a hand-held radiotelephone for use in the distributed radiotelephone system of the present invention.
Figure 6:
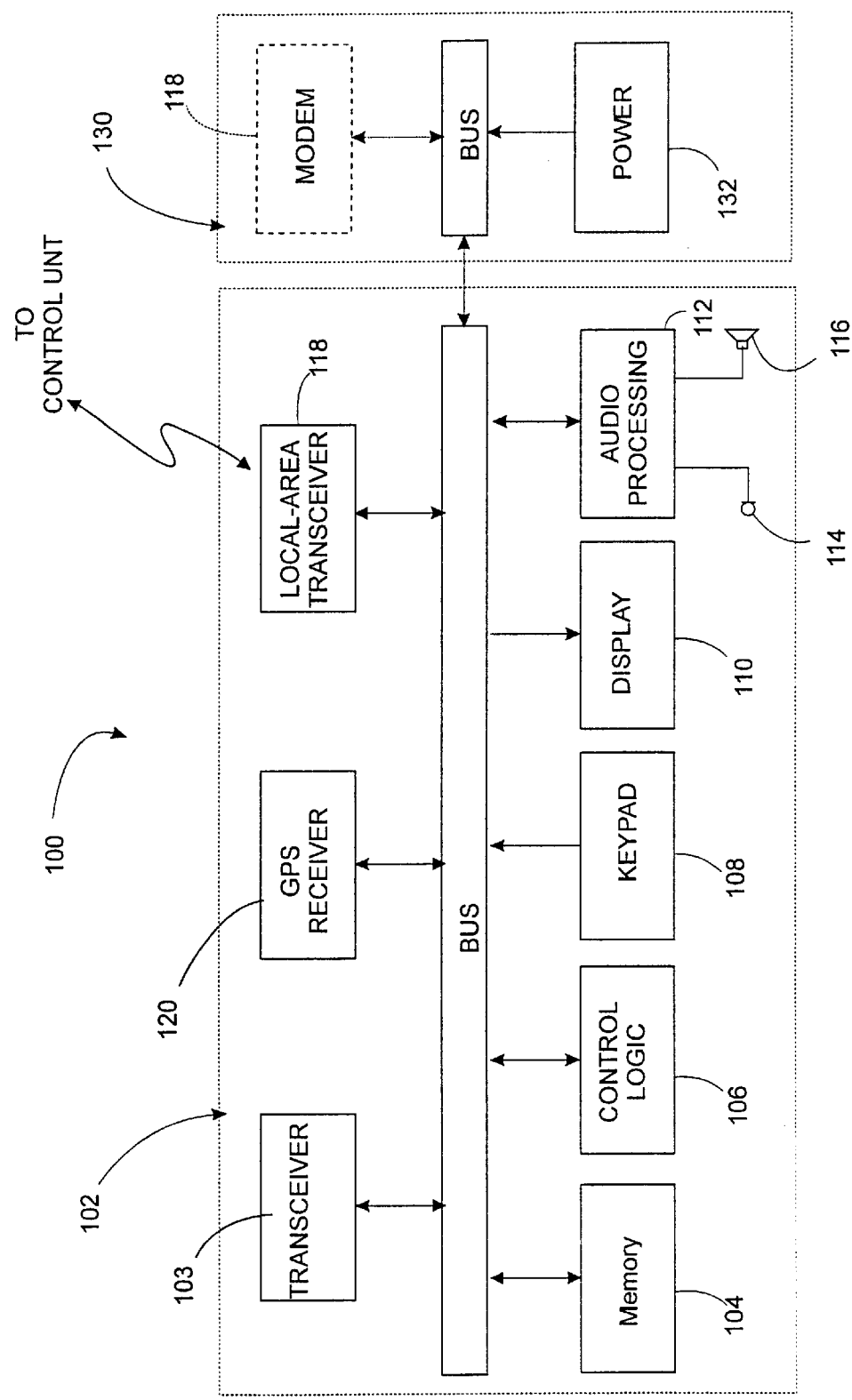
FIG. 6 is a block diagram of the hand-held radiotelephone wherein the modem is contained in the radiotelephone housing.

Referring now to FIG. 5 and 6, a hand-held radiotelephone 100 is shown that may be used as a base unit 20 in a distributed phone system 10. The radiotelephone 100 includes a main housing 102 and a removable battery pack 130. The main housing 102 contains an RF transceiver 103, memory 104, control logic 106, keypad 108, display 110, audio processing circuits 112, microphone 114 and speaker 116. The main housing 102 may also include a GPS receiver 120 for receiving position data from satellites. The battery pack 130 includes a power source 132 which may comprise either rechargeable batteries or an adapter which plugs into a power source.

To the extent thus far described, the hand-held telephone 100 is no different than a conventional hand-held radiotelephone. However, the hand-held telephone 100 of the present invention includes a built-in interface module 118, such as a Bluetooth module, for communicating with a built-in control unit 40 in a vehicle and/or a separate hands-free unit 60, as shown in FIG. 4. In FIG. 6, the interface module 118 is shown in the main housing 102 of the hand-held telephone 100. However, the interface module 118 could also be contained in the removable battery pack 130 as shown in dotted lines in FIG. 6. One advantage to the latter approach is that the interface module 118 is detachable and therefore may be offered as an optional accessory to the hand-held phone 100 rather than as an integral part of the phone 100.

The embodiment of FIGS. 5 and 6 could eliminate the control unit 40, since the mobile unit serving as a base unit 20 would provide the necessary controls. Thus, the distributed telephone system 10 could comprise the mobile phone 100 serving as a base unit 20 and a vehicle hands-free unit serving as the remote unit 60. The wireless link between the hand-held mobile telephone 20 and the hands-free unit 60 eliminates the need to insert the hand-held into the hands-free unit 60 as required in prior art devices. One benefit is that the hands-free unit 60 can be located anywhere in the vehicle and does not need to be within reach of the vehicle driver. This would allow the hands-free unit to be placed in a concealed location, such as under a seat, if desired.

Figure 7:
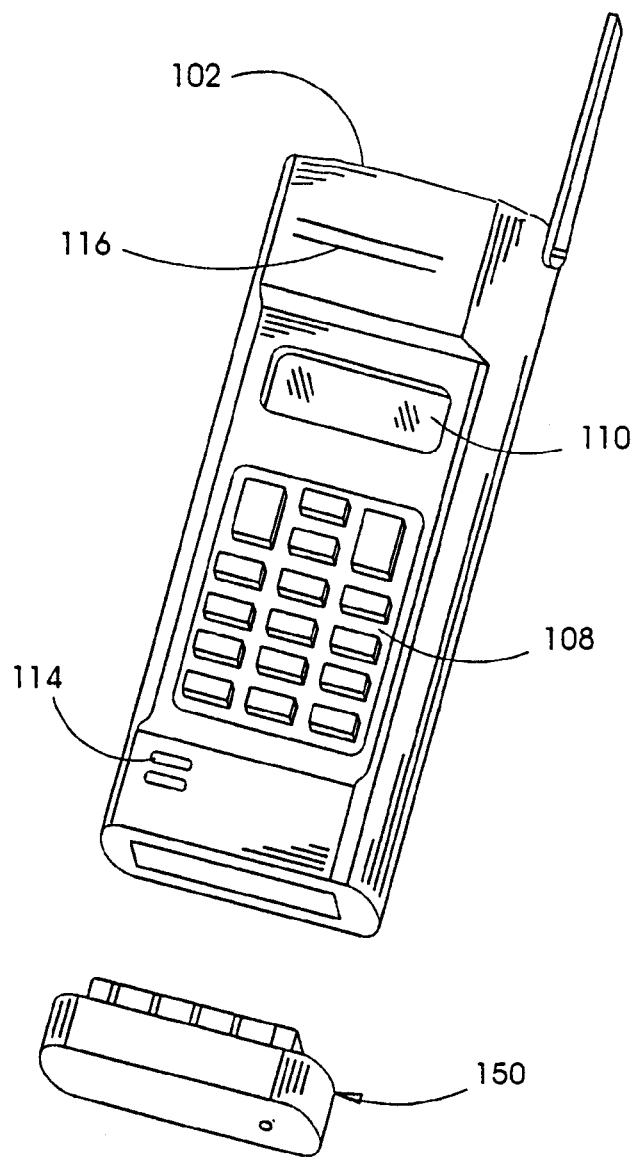
FIG. 7 is a perspective view of the hand-held radiotelephone with a modem adapter in the form of a detachable module.
Figure 8:
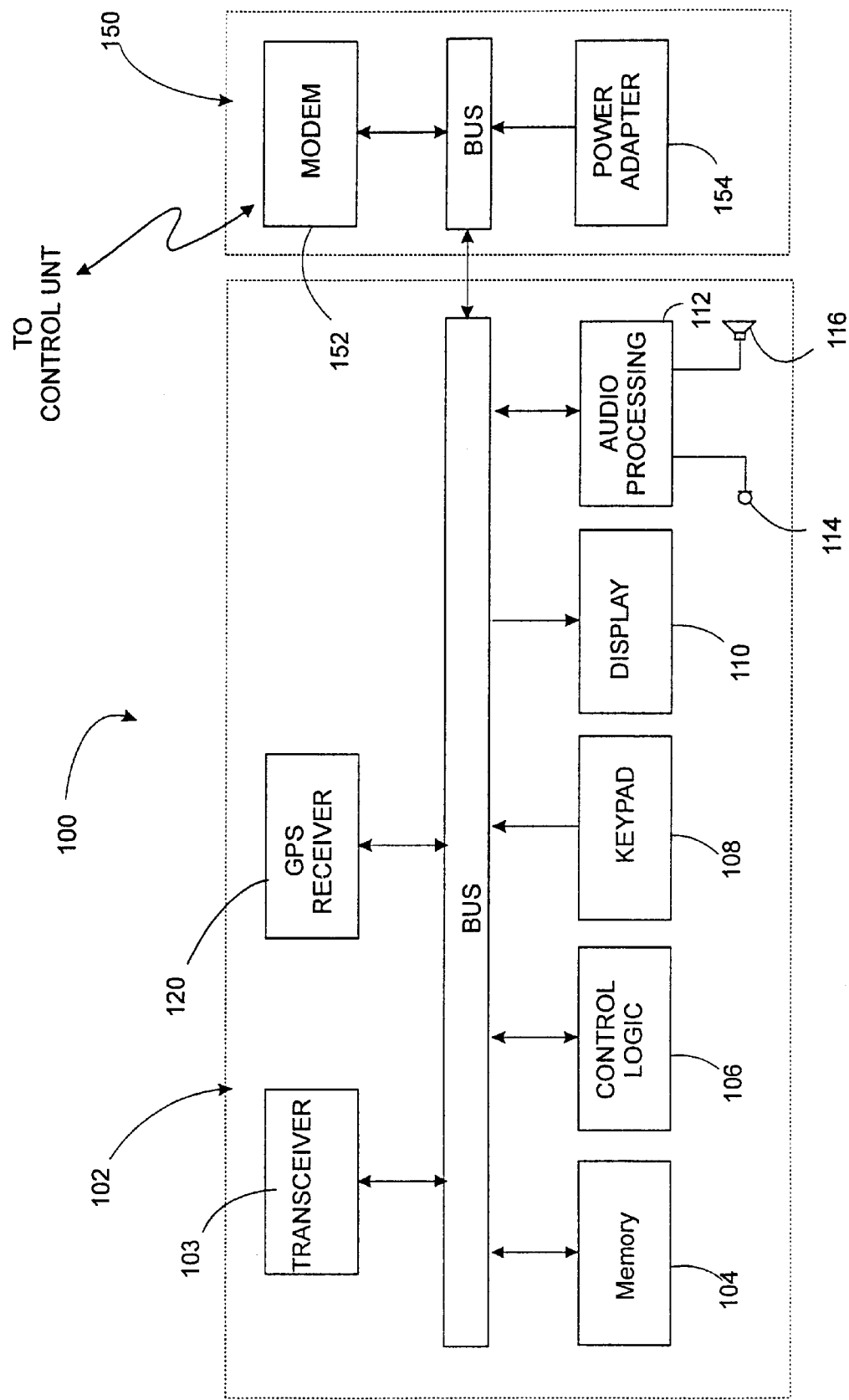
FIG. 8 is a block diagram of the hand-held radiotelephone with modem adapter.
Figure 9:
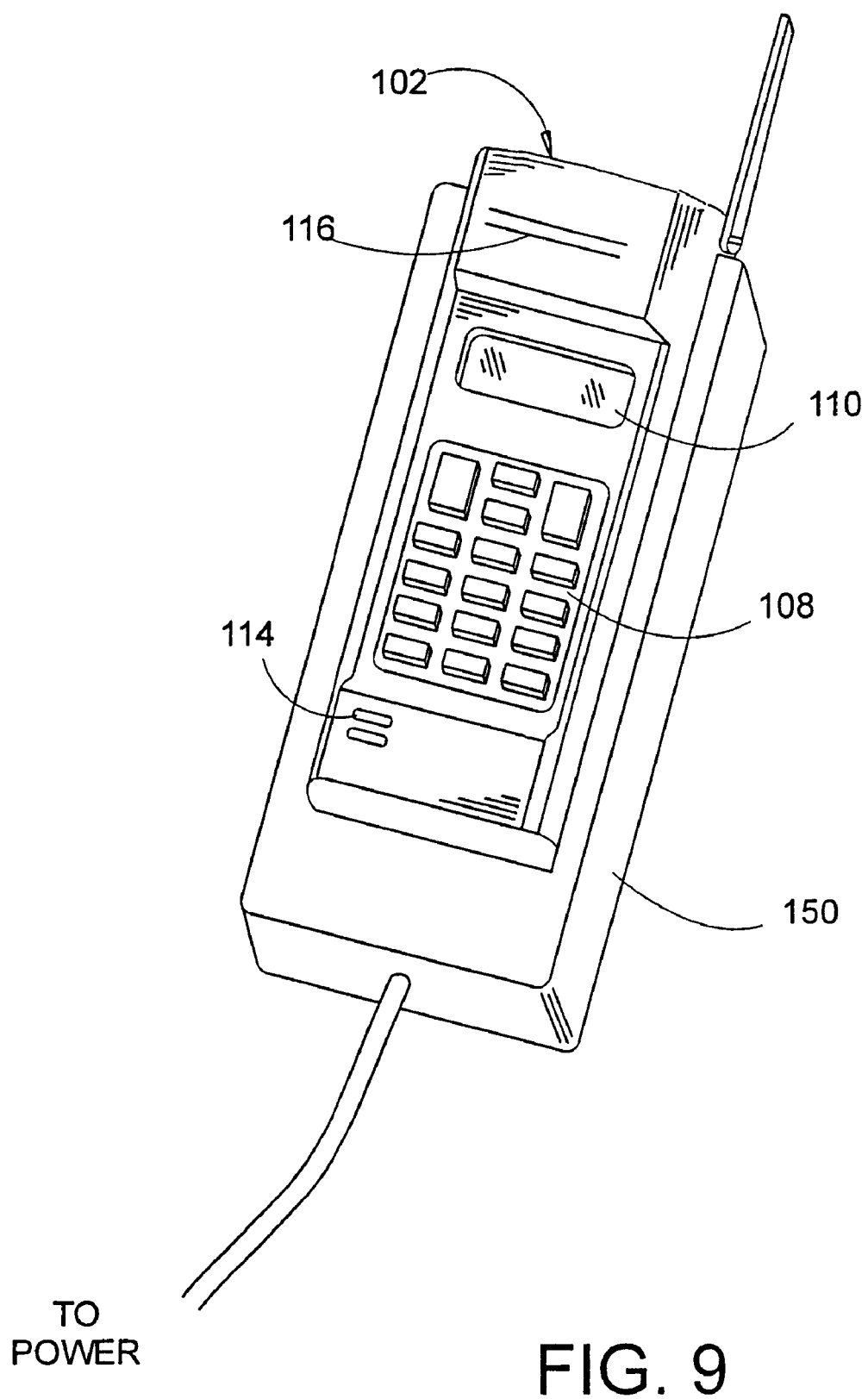
FIG. 9 is a perspective view of the hand-held radiotelephone with a modem adapter in the form of a cradle.

FIGS. 7–9 illustrate a hand-held radiotelephone for a distributed phone system that uses an interface adapter 150. In FIG. 7, the interface adapter 150 is in the form of a detachable module that plugs into a system interface on the hand-held telephone 100. The interface adapter 150 includes an RF interface module 152 to allow communication with a control unit 40 or a hands-free unit such as a remote unit 60 and a power adapter 154 to provide power to the hand-held telephone 100. The interface adapter 150 may also be in the form of a cradle that mounts in a vehicle as shown in FIG. 9.

The hand-held radiotelephone 100 of the present invention may be operated in a conventional manner. That is, the hand-held telephone's own keypad 108, display 110, microphone 114 and speaker 116 operate in a conventional manner to provide a user interface. When placed in a vehicle mode, the hand-held radiotelephone's interface elements may be at least partially disabled, and control passes instead to the control unit 40 which is integrated into the vehicle's steering wheel (or a hands-free unit such as a remote unit 60). The hand-held radiotelephone 100 communicates with the control unit 40 via interface module 118.

The embodiments of the distributed radiotelephone system 10 of the present invention described above rely on a low power, limited distance RF link to provide communication between a base unit 10, control unit 40, and audio unit 60. Those skilled in the art will recognize, however, that other types of communication links may also be used in connection with the present invention. For example, one alternative would be to use a fiber optic network to link the distinct physical units of the distributed radiotelephone system 10. Often times, a fiber optic network is installed in the vehicle at the time of its manufacture to link the vehicle's ignition, charging, securing, and accessory systems. The physical units of the distributed radiotelephone 10 of the present invention, may communicate with one another using such an inherent vehicle network. The physical units of the distributed phone system 10 thus become attachments to the vehicle's inherent network.

Figure 10:
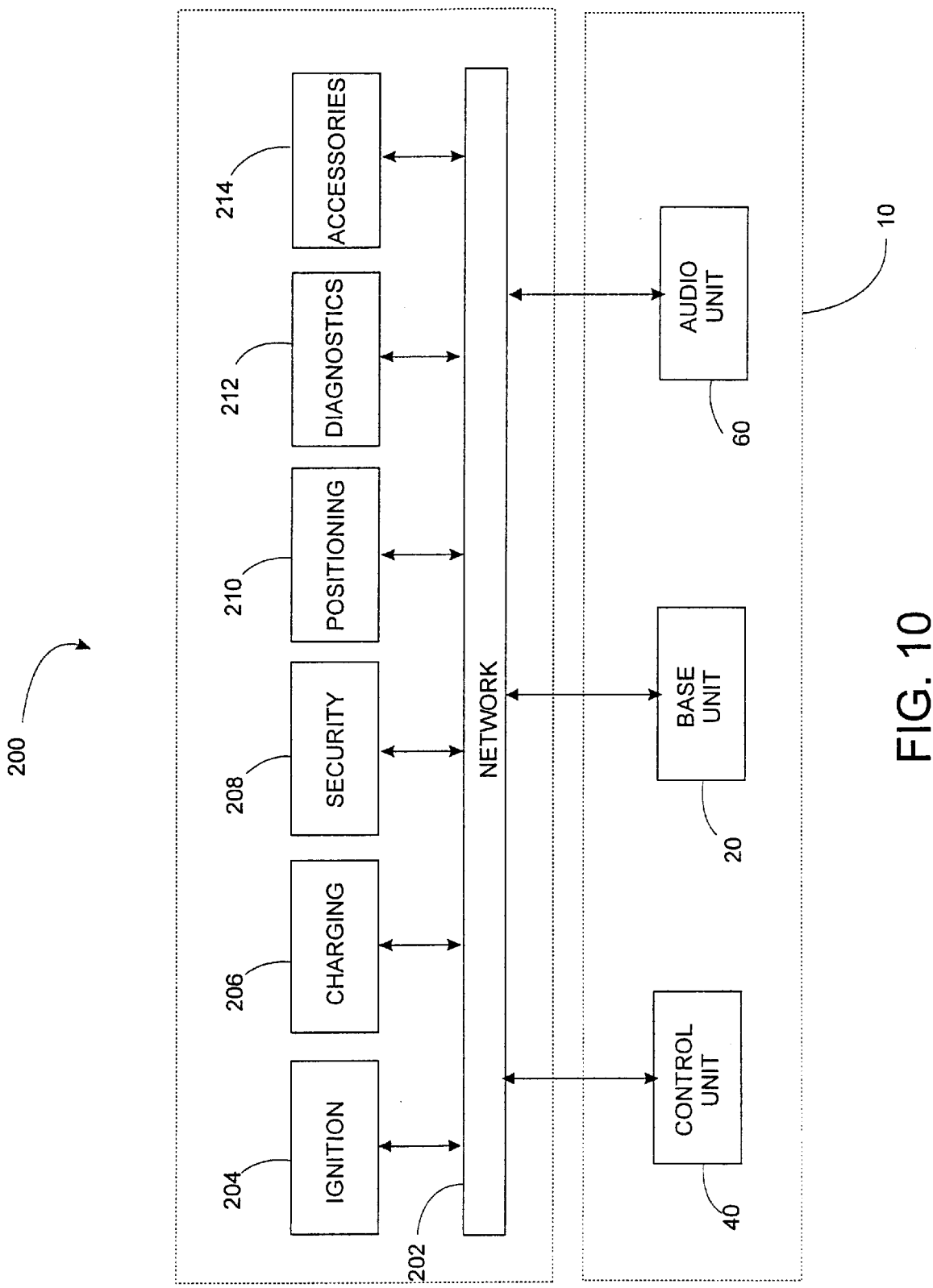
FIG. 10 is a block diagram of a distributed radiotelephone using an inherent vehicle-based network for communication between separate physical units.

FIG. 10 is a block diagram of a distributed radiotelephone system 10 which uses an inherent vehicle network 200 to communicate among the various physical units. The radiotelephone system includes a base unit 20, control unit 40, and optionally, an audio unit 60 which connect via an RF interface module to an inherent vehicle network indicated generally at 200. The vehicle network 200 includes a communications network 202 such as a fiber optic network. Attached to the communications network 202 are the vehicle's ignition system 204, charging system 206, security system 208, positioning system 210, diagnostic system 212, and various accessories 214. Since these inherent vehicle systems attach to the same network 202 as the distributed radiotelephone 10 of the present invention, the radiotelephone 10 of the present invention may operate in conjunction with the vehicle systems to augment such systems. For example, the vehicle security system 208 could be programmed to place a telephone call notifying local law enforcement authorities if the vehicle is stolen. This notification may include the position of the vehicle if either the vehicle or radiotelephone 10 has a GPS receiver. In another example, the radiotelephone 10 may be used to provide telemetry that carries diagnostic information concerning the vehicle itself, or software upgrades to various microprocessor functions for various vehicle systems.

Figure 11:
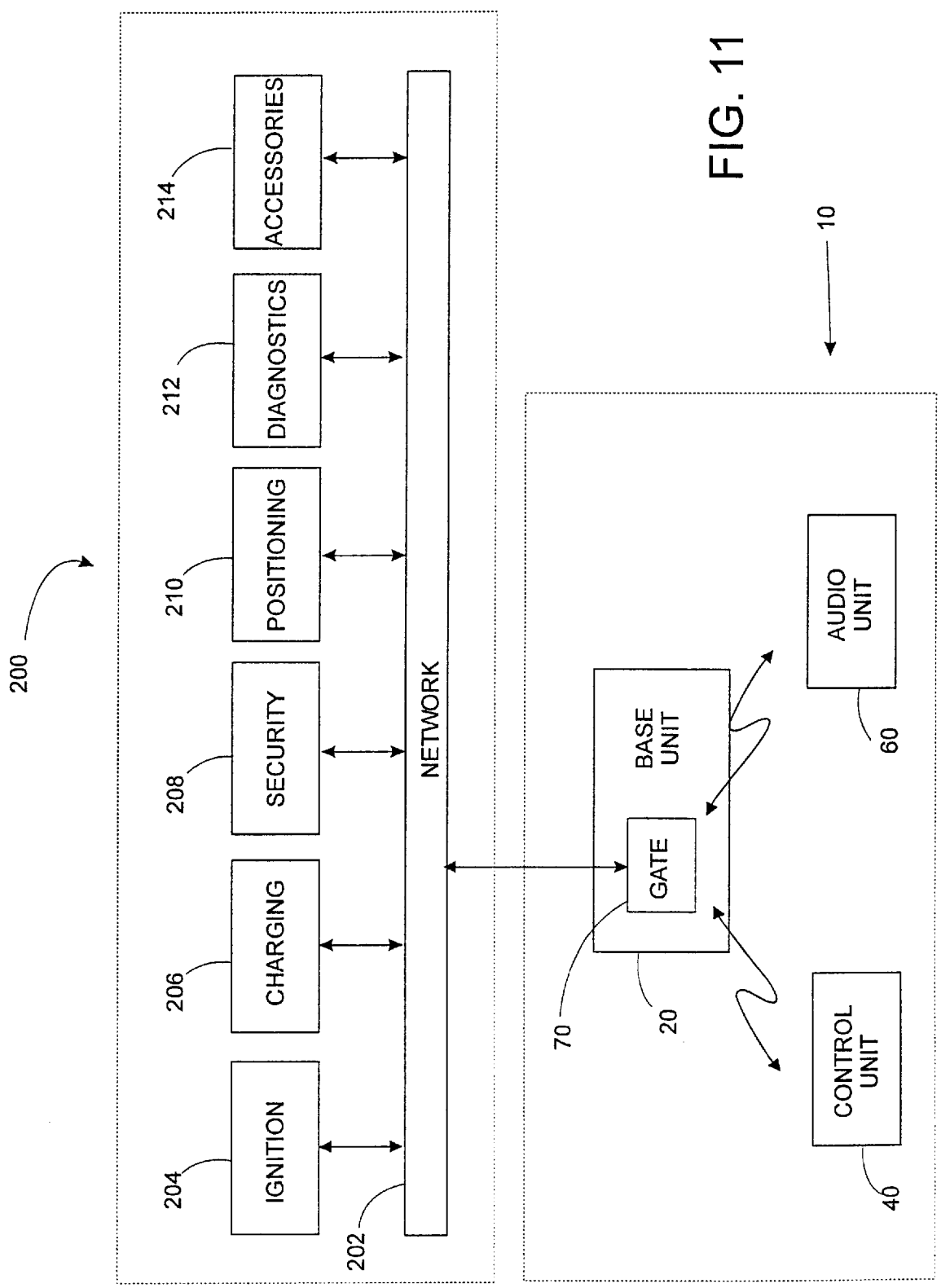
FIG. 11 is a block diagram of a distributed radiotelephone having a base unit connected to a vehicle-based network, and a control unit which communicates with the base unit by wireless link.

FIG. 11 shows an alternate method for connecting the radiotelephone 10 of the present invention to a vehicle network 200. As shown on FIG. 11, the base unit 20 is connected to the on-board communications network 202 in the vehicle by means of a bridge, gateway, router, packet switch, or similar device. The base unit 20 then communicates with the control unit 40 and audio unit 60 via wireless link as previously described. In the preferred embodiment, the bridge, gateway, or router resides in the base unit 20, but can also be a separate unit.

In the embodiment shown in FIGS. 10 and 11, the problem associated with connecting to a steering wheel hub are solved by sending control information in baseband digital form over one strand of a multi-strand clock-spring path, or by modulating control information onto a clock-spring path that it used as well for another purpose, such as the clock-spring that powers other electronic devices that are integrated with the steering wheel hub. The path so derived is then interconnected to the communications network 202 by a standard modem.

Figure 12:
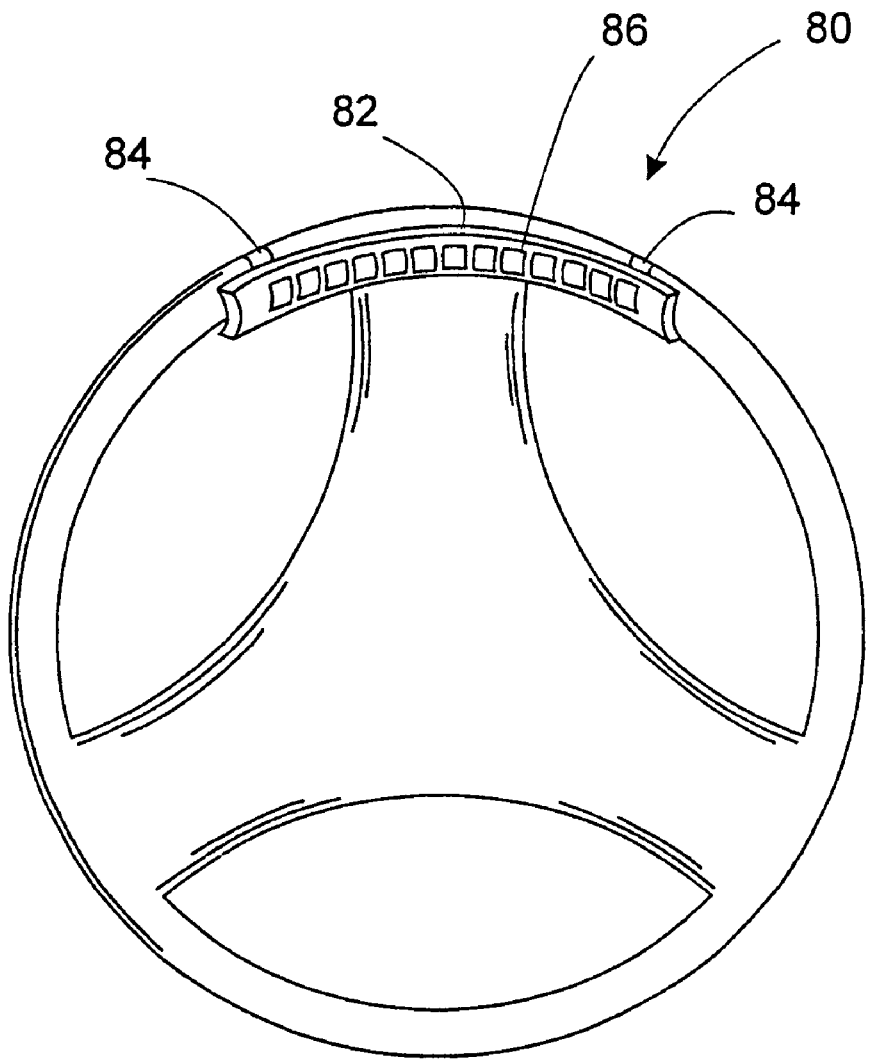
FIG. 12 is a schematic diagram of a remote dialing unit for a distributed radiotelephone.

Referring now to FIG. 12, another embodiment of the present invention is shown. In this embodiment, the control unit 40 is replaced by a remote dialing unit 80 having a housing 82 which attaches to the steering wheel of a vehicle by straps, clips, or other suitable fastening means 84. The remote data unit 80 is preferably located at the front of the steering wheel. Thus, the user can keep both hands on the steering wheel (at the 10 o'clock and 2 o'clock positions) while driving.

Figure 13:
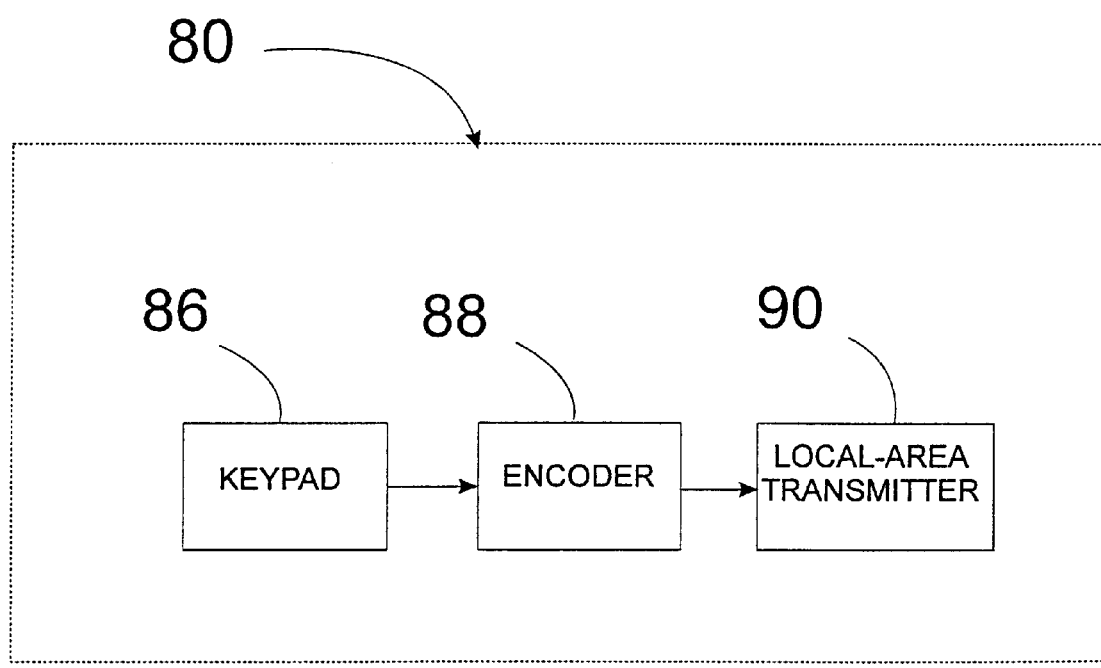
FIG. 13 is a block diagram of the remote dialing unit.

FIG. 13 is a functional diagram of the remote dialing unit 80. The remote dialing unit 80 includes a keypad 86 for entering dialing instructions, an encoder 88 for encoding data entered by the user, and a local area transmitter 90 for transmitting dialing instruction to the base unit 20.

The base unit 20 preferably comprises a radiotelephone 100 as shown in FIGS. 5 and 6 with the local area transceiver 118 being replaced by a local area receiver capable of receiving transmitted data from the remote data unit 80. The RF link is a simple ASK (on/off operation).

Rather than communicating directly with the radiotelephone, the remote data unit 80 could communicate with a cradle designed to hold the telephone 100. The local area receiver would be contained in the cradle and the cradle would send commands to the radiotelephone 100 over the system bus.

The present invention may be implemented to allow the control unit 40 and remote unit or hands-free unit 60 to operate with multiple base units 20. Such an implementation is particularly useful when a mobile telephone is used as the base unit 20. The vehicle in which the distributed radio telephone system 10 is deployed may be used by several different individuals, each of whom have their own mobile telephone. In this case, each mobile telephone would be identified by a unique identification number. The identification number for authorized users would be stored in the control unit 40 and/or hands-free unit 60. The base unit 20 transmits its identification number to the control unit 40 and hands-free unit 60 to activate the communication link between the mobile telephone and the hands-free unit 60. Access is denied unless an authorized identification number is received by the hands-free unit. Thus, the control unit 40 and hands-free unit 60 will be able to recognize several different users.

Figure 14:
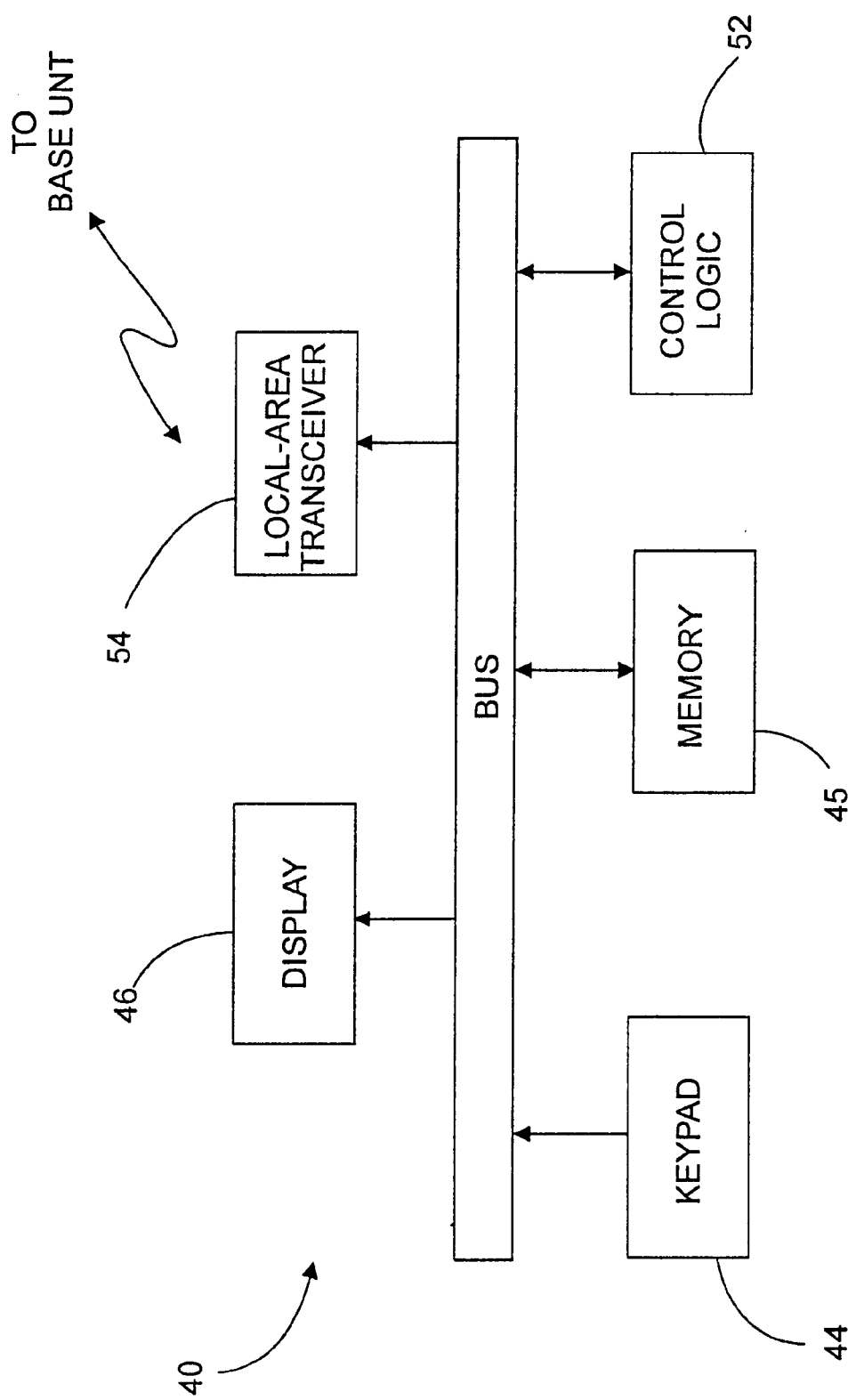
FIG. 14 is a block diagram of a control unit having a memory for storing identification and configuration data.
Figure 15:
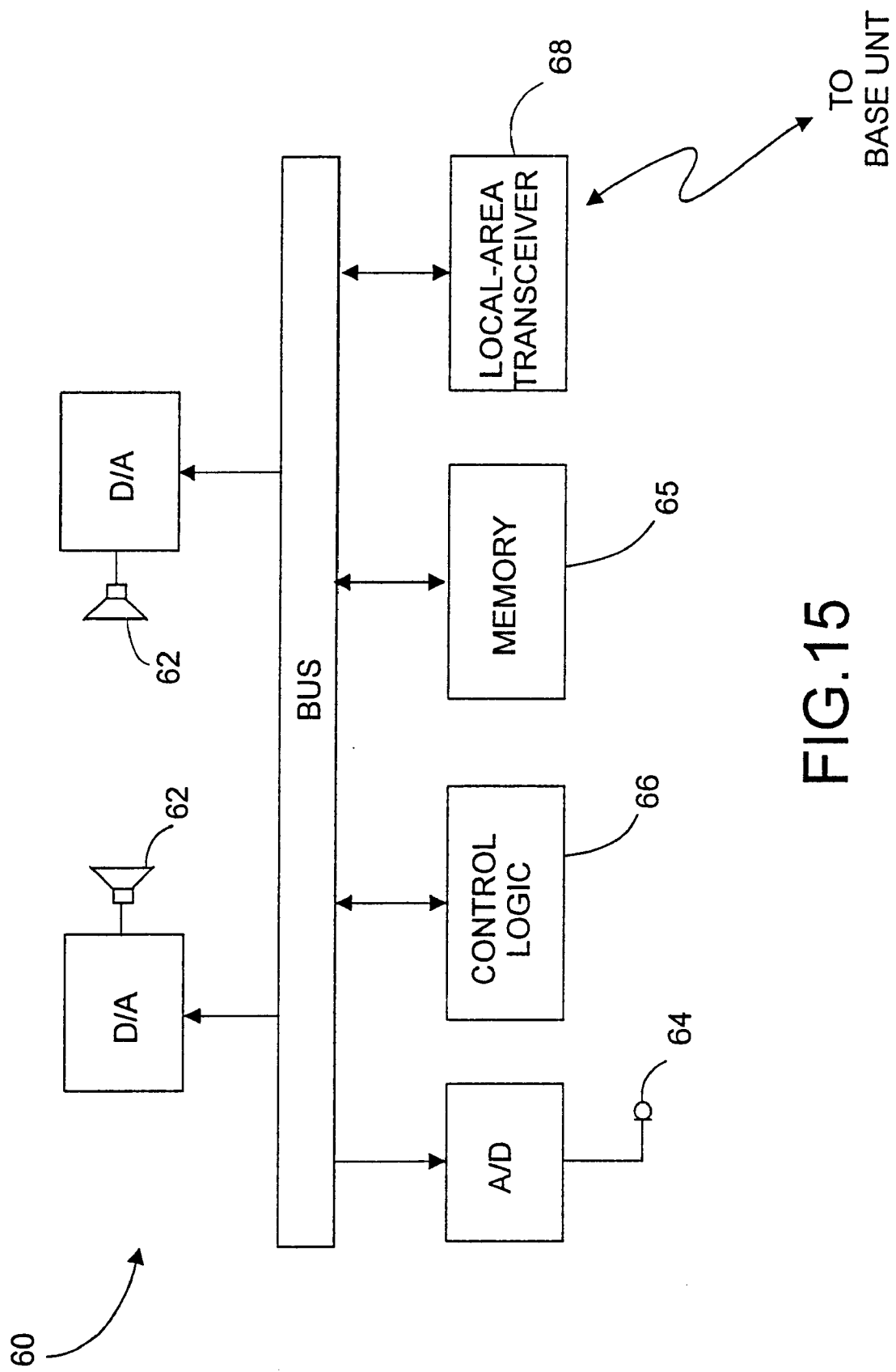
FIG. 15 is a block diagram of a hands-free unit having a memory for storing identification and configuration data.

Since the control unit 40 and hands-free unit 60 are able to discriminate between different users, it is possible to configure the control unit 40 and hands-free unit 60 depending on the user identification number received from the mobile telephone. FIGS. 14 and 15 are block diagrams illustrating, respectively, a control unit 40 and hands-free unit 60 that can be configured based on the user identification received from the base unit 20. The control unit 40 and hands-free unit 60 are the same as previously described with the addition of a memory module 45 or 65, respectively, for storing user profiles or configuration data. A user table is stored in memory 45 or 65 that includes an entry for each user of the system. The table includes the user identification number for each user along with configuration data for each user. The control logic in the hands-free unit 60 or control unit 40 is programmed to configure the unit based on the identification data received and the configuration data stored in its memory.

Figure 16:
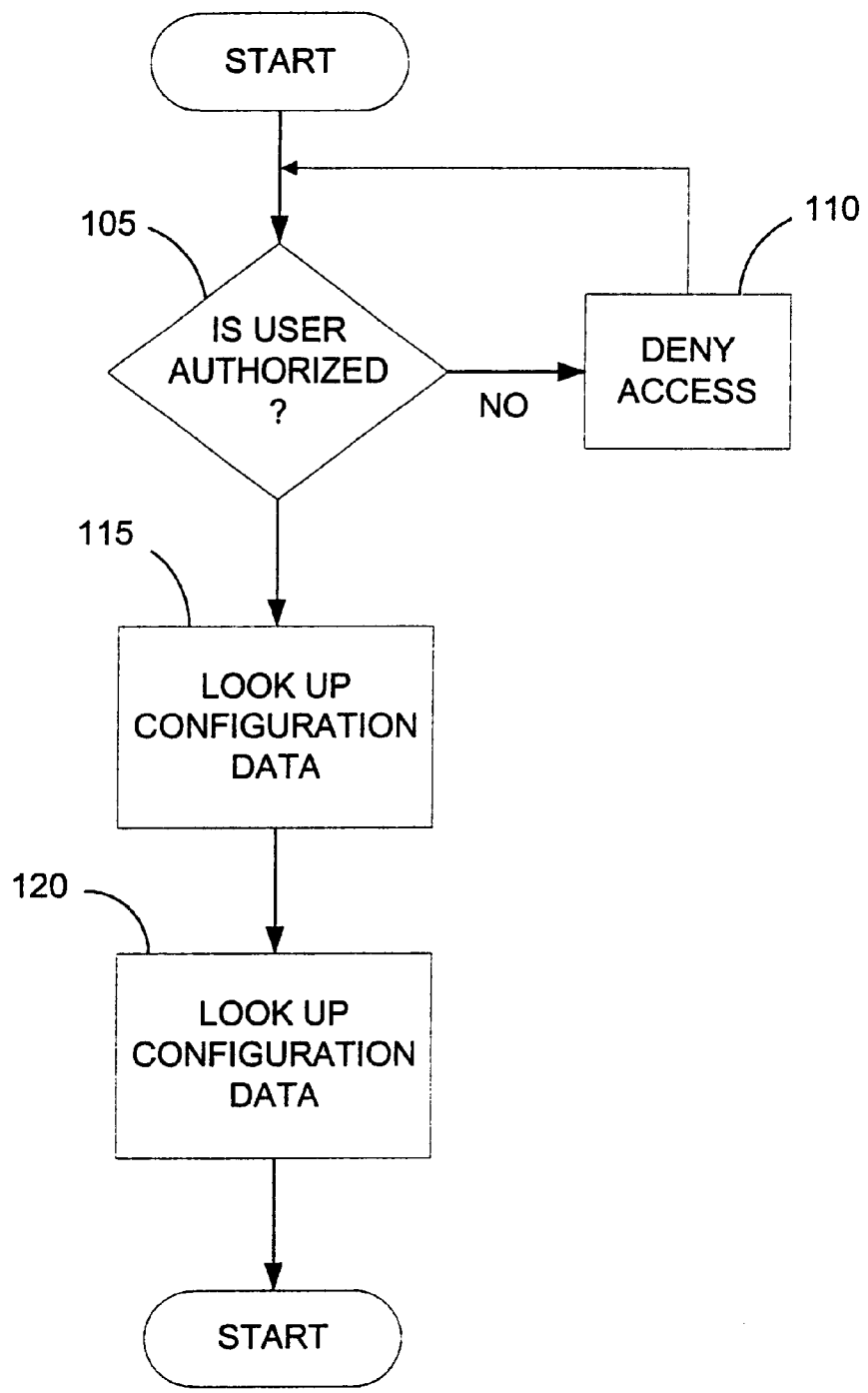
FIG. 16 is a flow diagram illustrating the operation of the control unit and hands-free unit of FIGS. 14 and 15.

FIG. 16 illustrates the control logic for the control unit 40 and hands-free unit 60. When the presence of the base unit is detected (block 100), the control logic first determines based on the received identification data, whether the user is authorized (block 105). The received identification data is compared to the user IDs stored in memory 45, 65. If the received identification does not match any entry in the user table, access is denied (block 110). If the identification data identifies an authorized user, the user identification number received from the base unit 20 is used to look up configuration data stored in the configuration tables (block 115). The control logic 52 or 66 then makes the appropriate settings based on the configuration data stored in memory 45 or 65 (block120).

In the hands-free unit 60, the configuration tables may be used to store information about user preferences. For example, the configuration data may be used to adjust the volume of the speaker based on individual user preferences. In the control unit 40, configuration data can be used, for example, to change the way in which information is formatted for display or the mapping of keys on the keypad. As additional functions are incorporated into the control unit 40 and hands-free unit 60, those skilled in the art will find many other ways in which configuration data may be used to implement individual user preferences.

Another way in which configuration data may be used is to reconfigure the interface between the control unit 40 and/or hands-free unit 60 and the base unit 20. Different users of the system may own different types of mobile telephones which use slightly different interfaces. In this case, the configuration data could include the make and model of the phone associated with a particular user identification number. When the base unit 20 is detected, the interface would be configured appropriately for the particular make and model of the phone being used. Thus, the distributed phone system could be used with different phones that do not employ a standard interface.

In the embodiment in which the control unit 40, base unit 20, and hands-free unit 60 interface with an inherent network in a vehicle, the user identification number could be passed to a controller in the vehicle. The vehicle controller could access a user table that stores individual user preferences. For example, in vehicles with electric seats and mirrors, the seats or mirrors could be automatically adjusted by the vehicle controller based on the user identification number received from the base unit. The vehicle audio system could also be programmed differently based on the user-identification. For example, the vehicle controller could program the buttons of a stereo receiver in a vehicle. Those skilled in the art will no doubt find other ways in which the user identification number can be used to advantage to make adjustments in the vehicle based on the user identification number. The present invention may, of course, be carried out in other specific ways than those herein set forth without departing from the-spirit and the essential characteristics of the invention. The present embodiments are therefore to be construed in all aspects as illustrative and not restrictive and all changes coming within the meaning and equivalency range of the appended claims are intended to be embraced therein.

We claim:

1. A mobile communication system for a vehicle, said system comprising:
   a) a base unit including, long-range radio transceiver for communicating with a station outside of said vehicle;
   b) a hands-free unit adapted to be mounted within said vehicle;
   c) a short range radio link between said base unit and said hands-free unit to enable communication of voice and/or data signals between said base unit and said hands-free unit;
   d) a programmable memory in said hands-free unit for storing a user table containing user identification data for authorized users and user configuration data associated with said user identification data for configuring said hands-free unit based upon the user identification received from said base unit; and
   e) programmable logic in said hands-free unit responsive to receipt of an authorized user identification to establish said short-range radio link with said base unit and to configure said hands-free unit based on said user identification.

2. The mobile communication system of claim 1 wherein said short range radio link includes a first short-range radio transceiver in said base unit and a second short-range radio transceiver in said hands-free unit, wherein said first and second short-range transceivers operate in an unregulated frequency band.

3. The mobile communication system of claim 2 wherein said short-range radio transceivers operate in the 2.45 GHz frequency band.

4. The mobile communication system of claim 1 wherein said hands-free unit includes a programmable memory unit for storing a user table containing user identification data for authorized users, and programmable logic responsive to receipt of an authorized user identification to establish said short-range radio link.

5. The mobile communication system of claim 4 wherein said user table contains configuration data associated with said user identification data for configuring said hands-free unit based upon the user identification received from said hand-held unit.

6. The mobile communication system of claim 1 wherein said configuration data includes user preference data.

7. The mobile communication system of claim 1 further comprising a control unit including a keypad and a display mounted in a fixed location in said vehicle for controlling operation of said base unit.

8. A method for communicating voice and data signals between a hand-held radio telephone and a vehicle-mounted hands-free unit comprising:
   a) storing user identification data and user configuration data for authorized users in a programmable memory in a hands-free unit;
   b) receiving a user identification at a hands-free unit from a base unit;
   c) establishing communication with said base unit if the user identification received from the base unit identifies an authorized user;
   d) configuring said hands-free unit based on said stored configuration data for said authorized user; and
   d) receiving voice and data signals over said short-range radio interface at said hands-free unit.

9. A mobile communication system for a vehicle, said system comprising:
   a) a base unit including, long-range radio transceiver for communicating with a station outside of said vehicle;
   b) a control unit disposed in a fixed location in said vehicle remotely from said base unit, said control unit including an input device for receiving user input to control said transceiver;
   c) a short range radio link between said base unit and said control unit to enable communication of control and data signals between said hand-held unit and said control unit;
   d) a programmable memory in said control unit for storing a user table containing user identification data for authorized users and configuration data associated with said user identification data for configuring said control unit based upon the user identification received from said base unit; and e) programmable logic in said control unit responsive to receipt of an authorized user identification to establish said short-range radio link with said base unit and to configure said control unit based on said user identification.

10. The mobile communication system of claim 9 wherein said short range radio link includes a first short-range radio transceiver in said hand-held unit and a second short-range radio transceiver in said hands-free unit, wherein said first and second short-range transceivers operate in an unregulated frequency band.

11. The mobile communication system of claim 9 wherein said short-range radio transceivers operate in the 2.45 GHz frequency band.

12. The mobile communication system of claim 9 wherein said configuration data comprises user preference data.

13. The mobile communication system of claim 9 further comprising a wireless hands-free unit including a microphone and speaker communicating with said base unit.

14. The mobile communication system of claim 9 wherein said control unit further includes display.

15. The mobile communication system of claim 9 wherein said control unit removably mounts to the steering wheel of a vehicle.

16. The mobile communication system of claim 15 wherein said control unit removably mounts to rim of the steering wheel.

17. A method for communicating voice and data signals between a base transceiver and a control unit, said method comprising:

a) storing user identification data and user configuration data for authorized users in programmable memory in said control unit;

b) receiving a user identification at said control unit from said base unit;

c) establishing communication between said base unit and said control unit if the user identification received at the control unit from the base unit identifies an authorized user;

d) configuring said control unit based on said stored configuration data for said authorized user; and d) exchanging data signals over said short-range radio interface between said base unit and said control unit.

* * * * *